United States Patent

[11] 3,619,586

[72] Inventors Marcian E. Hoff, Jr.
Mountain View;
Patrick E. Mantey, San Jose, both of Calif.

[21] Appl. No. 778,643
[22] Filed Nov. 25, 1968
[45] Patented Nov. 9, 1971
[73] Assignee Research Corporation
New York, N.Y.

[54] UNIVERSAL DIGITAL FILTER FOR LINEAR DISCRETE SYSTEMS
21 Claims, 5 Drawing Figs.

[52] U.S. Cl. .......... 235/156, 235/152
[51] Int. Cl. .......... G06f 7/38, G06f 1/02
[50] Field of Search .......... 235/152, 156; 340/15.5; 307/22.9; 328/165, 167

[56] References Cited

UNITED STATES PATENTS

| | | | |
|---|---|---|---|
| 3,303,335 | 2/1967 | Pryor | 235/181 |
| 3,370,292 | 2/1968 | Deerfield | 328/167 X |
| 3,518,414 | 6/1970 | Goodman et al. | 235/156 X |
| 3,521,041 | 7/1970 | Van Blerkom et al. | 235/152 X |
| 3,521,042 | 7/1970 | Van Blerkom et al. | 235/152 X |

OTHER REFERENCES

Digital Process for Sampled Data Systems, A. J. Monroe, John Wiley & Sons, Inc., Sept. 1962, pgs. 450–461

*Primary Examiner*—Malcolm A. Morrison
*Assistant Examiner*—James F. Gottman
*Attorney*—Lindenberg and Freilich

ABSTRACT: A second-order recursive digital filter is disclosed for use as a universal building block in which a first summing means is provided for cyclically computing the function $f(n)=CX(n)+2(\alpha+\beta_2)f(n-1)-f(n-2)+\beta_1[(\alpha+\beta_2)f(n-1)-fn-2)]$ where $X(n)$ is a sampled input signal in digital form, $f(n-1)$ is the function $f(n)$ delayed one computational cycle by a first unit operator and $f(n-2)$ is the function $f(n-1)$ delayed one computational cycle by a second unit operator. The coefficient C is a scaling parameter controlling the center-band gain of the filter. The coefficients $\alpha$ and $\beta_2$ together determine the center frequency of the filter passband while the coefficient $\beta_1$ controls the bandwidth of the filter. The coefficient $\alpha$ is limited to the values +1, 0 and −1 in order that implementation of a multiplier for the coefficient $\beta_2$ may result in some cost savings. The product $\alpha f(n-1)$ is then added to the product $\beta_2 f(n-1)$. A second summing means is provided for cyclically computing the digital filter output in accordance with the following equation:

$$Y(n)=A_0 f(n)+A_1 f(n-1)+A_2 f(n-2)$$

where $A_0$, $A_1$ and $A_2$ are coefficients which control the "-zeroes" of the filter response, and are set equal to +1, 0 and −1 respectively for a narrow-band digital filter. The coefficient $\beta_1$ is set equal to zero for the filter to operate as an oscillator. A first order digital filter may be readily provided by modifying the first and second summing means to cyclically compute the functions $f(n)=CX(n-1)+Df(n-1.$ and $Y(n)=<\omega A_0 f(n)+Af(n-1)$, where D is a coefficient equivalent to $\alpha+\beta_2+1$.

INVENTORS
MARCIAN E. HOFF, JR.
PATRICK E. MANTEY
BY Lindenberg & Freilich
ATTORNEYS INVENTORS
MARCIAN E. HOFF, JR.
PATRICK E. MANTEY
BY Lindenberg & Freilich
ATTORNEYS INVENTOR.
MARCIAN E. HOFF, JR.
PATRICK E. MANTEY
BY
Lindenberg + Freilich
ATTORNEYS

UNIVERSAL DIGITAL FILTER FOR LINEAR DISCRETE SYSTEMS

BACKGROUND OF THE INVENTION

This invention relates to a digital filter channel and more particularly to first and second-order digital filters of the recursive type.

There is a growing need for digital filters, i.e., apparatus which act like conventional filters to pass selected frequencies, or bands of frequencies, by computational processes or algorithms which allow a sampled signal converted into a sequence of numbers to be transformed into a second sequence of numbers. If reconverted to analog form, the second sequence of numbers constitutes a filtered output signal of the analog input signal. Such digital filters are useful in the simulation of linear dynamic systems, signal filtering as in telemetry, feedback channels for industrial process control systems, spectrum analyzers, and the like. Depending upon the application, the algorithm or computational process may be that of a low pass filter, band-pass filter, integrator, differentiator, and the like. But regardless of the application, it can be shown that the transfer characteristic of the linear filter system for which a digital filter is desired can be represented by the following general form:

$$H(s)=\frac{\sum_{m=o}^{M} c_m s_m}{\sum_{n=o}^{N} d_n s_n} \qquad (1)$$

It can also be shown that the corresponding digital transfer characteristic is of the following form:

$$\frac{Y(Z)}{X(Z)}=\frac{\sum_{j=o}^{N-1} a_j Z^{-j}}{1+\sum_{j=1}^{N} b_j Z^{-j}} \qquad (2)$$

where Z is the standard Z-transform operator and $Z^{1j}$ is the delay operator.

Accordingly, the digital signal represented by the foregoing equation (2) may be thought of in terms of a sequence of numbers, each representing the value Y($n$) of the analog signal at the sampling instant $n$. Relating that to the sampled input signal X($n$) and solving for the current value Y($n$) provides an equation of the following form: $Y(n)=A_0f(n)+A_1f(n-1)+A_2f(n-2)+B_1f(n-1)+B_2f(n-2)$ 3. where $f(n)=X(n)+B_1f(n-1)+B_2f(n-2)$. For poles at Z equal to $\beta e^{j\omega_0 T}$ the coefficients $B_1$ and $B_2$ are equal to 2 ($\beta\cos\omega_0$T) and $-\beta^2$.

Such a recursive filter has been suggested in the past, but its implementation is not well suited for efficient construction with digital functional components, especially if the poles are nearly unity in magnitude. That is because implementation of the filter of equation (3) requires that values $B_1$ and $B_2$ be very accurately specified or the effective value of $\beta$ will be greater than unity and the filter becomes unstable. Thus, while other organizations for producing the same filter characteristics exist, they require far greater accuracy in the coefficients $A_o$...and $B_1$...and in the stored intermediate values $f(n)$, $f(n-1)$.... Consequently such other organizations require much more hardware for realization than the present invention, particularly for real-time filter operations. Most published digital filters have been realized through software (i.e., through programing of a general purpose digital computer) where in effect unlimited hardware is available. For many applications, particularly those requiring real-time digital filtering, a special purpose arrangement of hardware components may be desirable. If so, an arrangement optimized for efficient hardware realization is desirable.

Such an optimized arrangement is particularly useful in realizing any linear discrete system having a single input and a single output. For multiple input/output systems, a plurality of such arrangements or building blocks may be used, each in accordance with the following equation:

$Y(n)=a_oX(n)+a_1X(n-1)+a_2X(n-2)+b_1Y(n-1)+b_2Yn-2)$ 4. where X($n$) is the input, and Y($n$) is the output. The corresponding Z transform function is $$\frac{Y(Z)}{X(Z)}=\frac{a_o+a_1Z^{-1}+a_2Z^{-2}}{1-b_1Z^{-1}-b_2Z^{-2}} \qquad (5)$$

The coefficients ($a_i$, $b_i$) can be chosen by a wide variety of methods, depending on the application.

OBJECTS AND SUMMARY OF THE INVENTION

A primary object of this invention is to provide a universal building block for linear discrete systems optimized for efficient realization with hardware.

Another object is to provide a digital band-pass filter optimized for efficient realization with hardware.

Another object is to provide an optimum digital filter equivalent to a continuous RLC filter.

Another object is to provide an optimum digital filter equivalent to an RL or RC continuous filter.

Still another object is to provide an optimum digital oscillator.

Yet another object is to provide a digital filter which may be operated as the digital equivalent of a desired second order filter, including a narrow band filter, or an oscillator, by proper selection of coefficients.

According to the invention, the straight forward implementation of a second-order digital filter of the recursive type is optimized by implementing the recursive part of the digital filter in accordance with the following equation:

$f(n)=CX(n)+2(\alpha+\beta_2)f(n-1)-f(n-2)+\beta_1[(\alpha+\beta_2)f(n-1)-f(n-2)]$ 6 where the sum $\alpha+\beta_2$ may be provided as a single coefficient K, but in accordance with one feature of the present invention, the split coefficients are employed to provide the desired product by adding the product $\alpha f(n-1)$ to the product $\beta_2f(n-1)$. By thus dividing the coefficient K into two parts, significant savings in hardware may be realized for a given filter accuracy when the valve of one ($\alpha$) is limited to the values +1, 0 and −1. The value of the second ($\beta_2$) is then so selected as to determine, together with the first, the desired center frequency of the filter passband while $\beta$1 controls the Q or bandwidth of the filter. The digital filter output Y of the input X is then obtained by implementing the nonrecursive part of the digital filter in accordance with the following equation:

$Y(n)=A_0f(n)+A_1f(n-1)+A_2f(n-2)$ 7. Two unit delay operators are employed to develop from $f(n)$ the sequences $f(n-1)$ and $f(n-2)$. Operation of the digital filter is synchronized such that $f(n)$ is computed cyclically, one cycle for each successive sample X($n$) of an input function X. The coefficient C is a scaling parameter for controlling the centerband gain of the filter. The coefficients $A_o$, $A_1$ and $A_2$ are used to control the zeros of the filter response. When the coefficients $A_o$, $A_1$ and $A_2$ are selected to be equal +1, 0 and −1, respectively, the filter functions as a narrow band digital filter. When the coefficient$\beta_1$ is selected to be equal to zero, the filter functions as a digital oscillator operating at a frequency determined by the coefficient K. The coefficients $A_o$, $A_1$ and $A_2$ are then selected to obtain digital oscillator operation at any relative phase at the frequency determined by the coefficient K.

In still another alternative form of the present invention, $f(n)$ is a function of only $f(n-1$ ) for a first-order filter. That is accomplished by modifying equation (6) to the following form:

$f(n)=CX(n)+Df(n-1)$ 8. where $D$ is equivalent to $\alpha+\beta_2+1$ and the coefficient $A_2$ in equation (5) is set equal to zero. Equation (6) can be rewritten as $f(n)=CX(n)+(2+\beta_1)(\alpha+\beta_2)f(n-1)-(1+\beta_1)f(n-2)$ 9. For comparison with equation (4), it can be shown that equations (7) and (9) may be combined to yield the following equation:

$Y(n)=CA_0X(n)+CA_1X(n-1)+CA_2X(n-2)+(2+\beta_1)(\alpha+\beta_2)Y(n-1)-(1+\beta_1)Y(n-2)$ 10. While equation (4) is mathematically simpler, digital realization of equations (6) and (7) is much more efficient with regard to hardware, and comparison of equations (4) and (10) shows that the latter is equivalent to the former and therefore the preferred realization, as the latter is developed from equations (6) and (7) which yield complete generality. To facilitate the comparison, it should be noted that $A_0$, $A_1$ and $A_2$ are equal to $\alpha_0/C$, $\alpha_1/C$ and $\alpha_2/C$, respectively, and that $\beta_1$ and $\beta_2$ are equal to $-(b_2+1)$ and $-\alpha+b_1/(2+\beta_1)$ respectively. The same arguments favor the arrangement of equation (8) for a first-order digital filter. To complete the first-order filter, only the first two terms of equation (7) are required. Since any system can be decomposed into first- and second-order systems, the present invention provides digital filter arrangements for efficient realization of any system.

In summary of the first two alternatives of the present invention, if the realized filter is a band-pass filter, the coefficients $\beta_1$ and $\beta_2$ selected control the bandwidth and center frequency respectively. By selecting the coefficients $A_0$, $A_1$ and $A_2$ to have the respective values +1, 0 and −1, a narrow-band digital filter is provided. If instead the coefficient $\beta_1$ is selected to be zero, the filter functions as an oscillator. In still another alternative form of the present invention, an optimized first-order recursive filter is provided equivalent to a lumped parameter RL or RC analog filter. With combinations of first- and second-order filters, any linear discrete transfer function can be directly realized in a most efficient manner.

The novel features considered characteristic of this invention are set forth with particularity in the appended claims. The invention will best be understood from the following description when read in conjunction with the accompanying drawings. BRIEF DESCRIPTION OF THE DRAWINGS FIG. 1 is a schematic diagram illustrating a second-order digital filter useful as a universal building block in accordance with the present invention.

DESCRIPTION OF THE PREFERRED EMBODIMENTS

Figure 1:
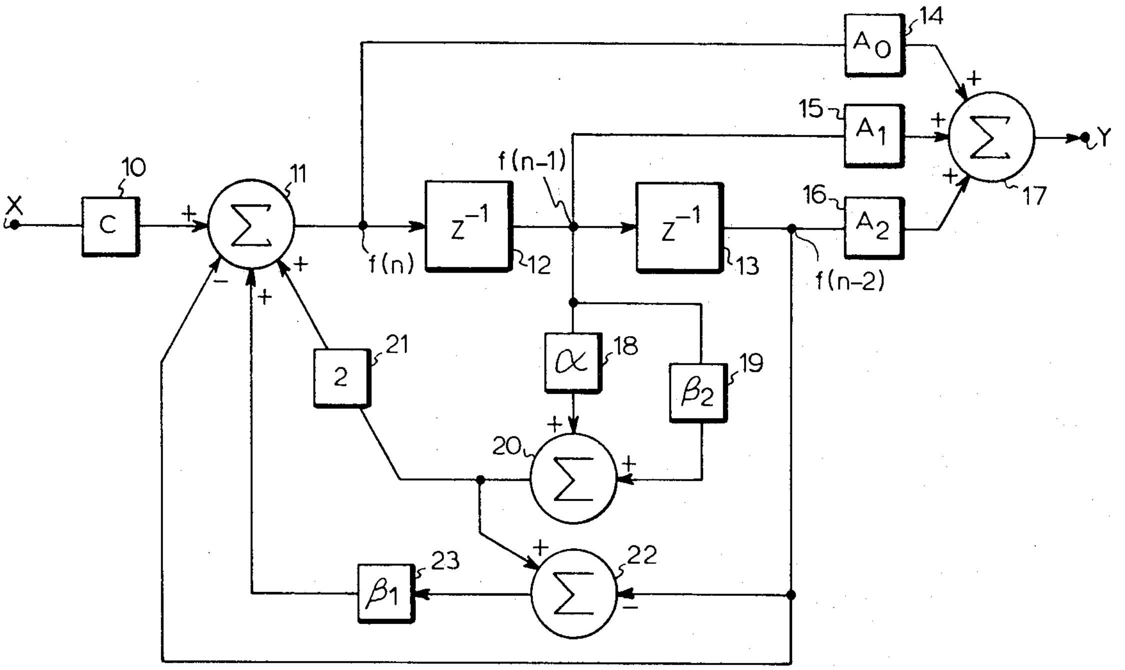

Referring now to FIG. 1, a second-order recursive filter is shown schematically as comprising a first multiplier 10, for multiplying each digital sample X($n$) of a sequence at its input terminal X by a coefficient C to develop a sequence of products CX($n$) proportional to amplitudes of successive samples of an analog input signal. The coefficient C is a scaling parameter for controlling the center-band gain of the filter, and may be some power of two so that it can be realized simply with gates for shifting X($n$) a predetermined number of binary places. Thus, the schematic diagram of FIG. 1 presupposes external means for digitizing an analog input signal, such as a periodic sampler and analog-to-digital converter, to sample the analog signal to be filtered at some arbitrary clock rate and generate a sequence of binary numbers each of which describes digitally the magnitude of the input signal at a given sampling. Summing means 11 then generates a sequence of numbers $f(n)$ in accordance with equation (6) set forth hereinbefore to describe the recursive part of the present invention. Unit delay operators 12 and 13 are provided to generate successive sequences of numbers $f(n-1)$ and $f(n-2)$ from the first sequence $f(n)$.

Multipliers 14, 15 and 16 are provided to multiply the three sequences of numbers $f(n)$, $f(n-1)$ and $f(n-2)$ by coefficients $A_0$, and $A_1$ and $A_2$. These coefficients are used to control the "zeros" of the filter response. They may be used to insert a notch in the filter passband characteristic curve, or they may be used to control the rolloff of the filter at extremes of frequency. Summing means 17 is then provided to add the respective products and provide at an output terminal Y a sequence of numbers Y($n$) representing the filtered input signal in digital form in accordance with equation (7) set forth hereinbefore. A digital-to-analog converter may be employed to provide an analog output signal, such as when the digital filter is employed to provide a filtered feedback signal in an analog industrial process controller.

Referring now to the summing means 11 and equation (6), it may be seen that the first and third terms are provided directly by the multiplier 10 and unit delay operator 13, respectively The second term is then provided by multiplier 18 and 19 which multiply each of the sequence of numbers $f(n-1)$ by coefficients $\alpha$ and $\beta_2$. The respective products are then combined by the summing means 20 and transmitted to the summing means 11 via a multiplier 21 which multiplies the output of the summing means 20 by two simply by gates for effectively shifting the output of the summing means one bit position in the direction of the most significant binary position. In an arrangement employing floating-point arithmetic, the shift is accomplished by simply adding a binary 1 to the mantissa.

The coefficients $\alpha$ and $\beta_2$ are related in that together they determine the center frequency of the filter passband while the coefficient $\beta_1$ controls the Q or bandwidth of the filter. By employing two coefficients, instead of one equal to $\alpha+\beta_2$, one coefficient ($\alpha$) may be limited to the values +1, 0 and −1 for some savings in hardware (for a given filter accuracy), particularly with the second coefficient $\beta_2$ a floating-point number and the sum of $\alpha$ and $\beta_2$ is very close to +1, 0 or −1. In other words, by making $\beta_2$ a floating-point variable, significantly fewer binary digits are required in the multiplier 19 than would be required to multiply by $\alpha+\beta_2$ directly.

Multiplier 18 may be readily implemented by gating circuits if $\alpha$ is limited to values of +1, 0 and −1. By so restricting $\alpha$, the second coefficient $\beta_2$ is kept in a desired range of $-1\ \beta_2\ 1$. Consequently, the operation of multiplier 18 is realized by a simple gating circuit that operates on the sign of the number $f(n-1)$ only for $\alpha$ equal to ±1, and a simple gating circuit that sets the output thereof to zero when $\alpha$ is equal to zero.

The fourth term provided as an input to the summing means 11 is produced by subtracting the output of the first unit delay operator 13 from the output of the summing means 20 through a summing means 22 and multiplying the difference by the coefficient $\beta_1$ in a multiplier 23.

As in the prior art referred to hereinbefore with regard to equations (3) and (4), the various coefficients of the digital filter are determined for a particular application by some computation procedure or known a priori by other requirements, or are found from filter specifications for the particular application through the approximation theory of rational functions of trigonometric polynomials or by a trial-and-error procedure. The coefficients may also be determined indirectly by first determining the continuous lumped parameter filter desired for a particular application, and then determining the digitation required by one of various methods known to those skilled in the art, such as the standard Z-transform method. Using the Z-transform method it can be shown, for example, that the coefficients for the equation (6) in realization of a filter with poles at $Z=\rho e^{\pm j \omega_o T}$ and zeros at $Z=\pm 1$ are given by the following:

$$\alpha=\begin{cases}1 \text{ for } \omega_o T<\pi/3\\ 0 \text{ for } \pi/3\leq\omega_o T<2\pi/3\\ -1 \text{ for } \omega_o T>2\pi/3\end{cases}$$

$$\beta_1=\rho^2-1$$

$$\beta_2=\frac{2\rho \cos T}{\rho^2+1}-\alpha$$

$$C=\frac{1-2\rho \cos \omega_o T e^{-j\omega_o T}+\rho^2 e^{-j2\omega_o T}}{1-e^{-j2\omega_o T}}$$

The coefficient C is an arbitrary scale factor, and would be generally unity. In the special case of a narrow-band filter illustrated in FIG. 3, efficiency is obtained by using C to make the parameters $A_o$, $A_1$ and $A_2$ equal to +1, 0 and −1, respectively. More generally, the coefficient C controls center-band gain and is used to keep the intermediate stored values within the range provided for by the unit operators 12 and 13. By limiting the value of C to ±1, or to some power of 2, the multiplication of X($n$) by that coefficient may be efficiently realized by simple gating circuits to shift X($n$). For instance to scale down X($n$) by a factor of four, X($n$) may be easily shifted in the direction of the least significant binary position two places by appropriately energized gates. Thus, the introduction of the coefficient C, like the introduction of the coefficient $\alpha$, does not require "multiplication", i.e., a digital multiplier.

Figure 2:
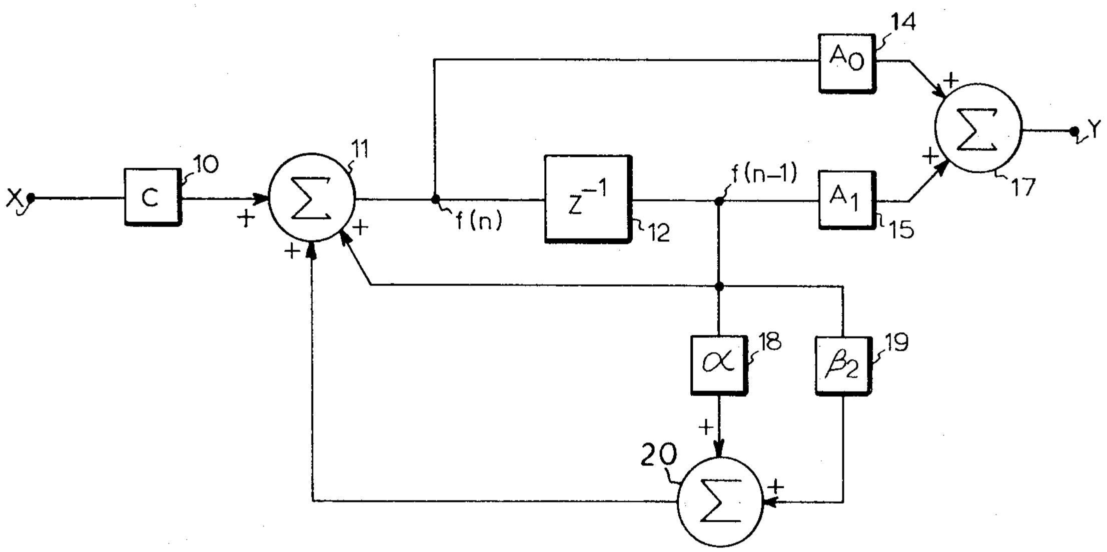
FIG. 2 is a schematic diagram illustrating a first-order digital filter also useful as a building block in accordance with the present invention.

For a first-order digital filter shown in FIG. 2, a single unit operator is employed and its output is connected directly to the summing means 11. The second unit operation 13 and summing means 12 are omitted, as well as the multipliers 16 and 23 which would then no longer have any input signals. The remaining elements would have the same function as in the second order digital filter of FIG. 1, and are therefore identified by the same reference numerals.

The general form of a single-order digital filter is as follows:

$$Y(n)=a_0X(n)+a_1X(n-1)+bY(n-1) \quad 11.$$

However, it is preferred to optimize realization of a first-order digital filter in the same manner as for a second-order digital filter in accordance with the following equations:

$$f(n)=CX(n)+(\alpha+\beta_2+1)f(n-1) \quad 12.$$

$$Y(n)=A_0f(n)+A_1f(n-1) \quad 13.$$

The recursive part of the filter defined by equation (12) could be realized by setting the coefficient $\beta_1$ of FIG. 1 equal to −1, setting the coefficient $A_2$ equal to zero and connecting the output of the first unit operator 12 to a positive input of the summing means 11 to add $f(n-1)$ to the quantity $f(n)$ otherwise computed when $\beta_1$ is set to −1, but a separate organization as shown in FIG. 2 is preferred since the objective is optimization from the cost point of view. As in the second-order filter, the use of two coefficients $\alpha$ and $\beta_2$ results in a cost savings over a multiplier for a single coefficient D equal to the sum $\alpha+\beta_2+1$ of equation (8). However, it should be noted that even if a single coefficient is substituted for at least the coefficients $\alpha$ and $\beta_2$, there will be optimization in the balance of the filter arrangement. Accordingly, the present invention is not to be regarded as limited to the use of separate coefficients $\alpha$ and $\beta_2$ in either the first- or second-order form. Significant cost reduction over the general form is achieved by the arrangements of FIGS. 1 and 2 even with the coefficients $\alpha$ and $\beta_2$ combined in one multiplier.

Figure 3:
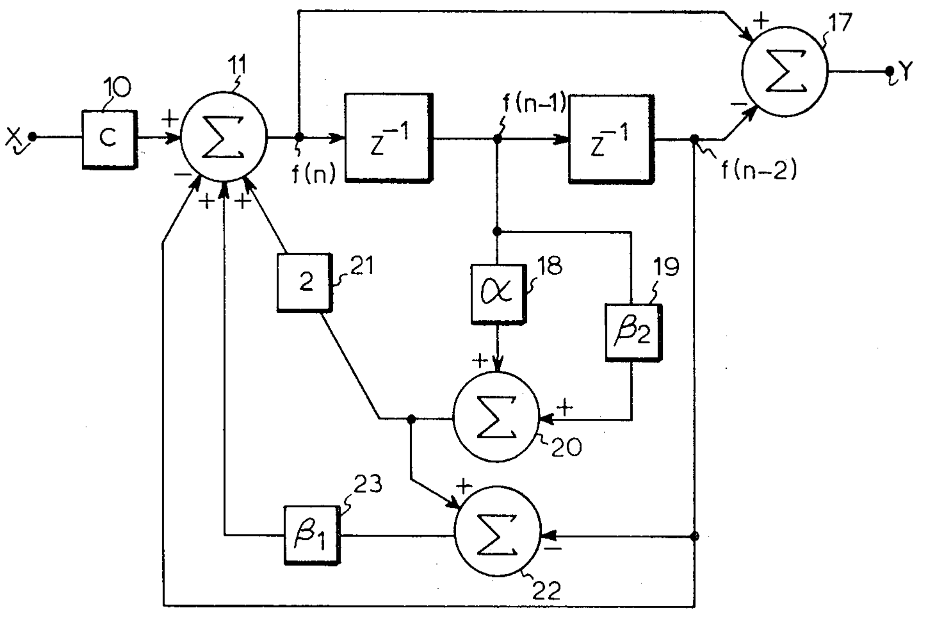
FIG. 3 is a schematic diagram illustrating a special case of the arrangement of FIG. 1, namely, a narrow-band digital filter.

For a realization of a narrow band digital filter to be used, for example, in spectral analysis, the configuration of FIG. 1 is modified by setting $A_o$ equal to +1, $A_1$ equal to 0, $A_2$ equal to −1 and selecting C as set forth hereinbefore for the example of a filter with poles at $Z=\rho e^{j \omega_o T}$ and zeros at $Z=\pm 1$. The resulting configuration is illustrated in FIG. 3 with the remaining functional components identified by the same reference numerals as in FIG. 1. The multiplier 15 is not shown in FIG. 3 since its coefficient is set equal to 0 and the multipliers 14 and 16 are similarly not shown since their coefficients are set to +1 and −1, respectively. Thus, it should be appreciated that if a digital filter of the configuration illustrated in FIG. 1 is to be used as a narrow band filter, those functional components should be removed. Sensitivity studies of the resulting configuration have shown that over most of the range of interest, the coefficient $\beta_1$ can be written in the following form:

$\beta_1=2^{-k}\beta_1$ where $\beta_1$ is an integer $2^{-4}$ $\beta_1 < 1$, and $k$ is any integer from 1 to 8. Similarly, the coefficient $\beta_2$ can be written in the following form:

$\beta_2=2^{-k}\beta_2$ where $\beta_2$ is an integer $2^{-12}$ $\beta_2 < 1$, and $k$ is any integer from 1 to 8.

As noted hereinbefore, the configuration of FIG. 1 has a center frequency controlled by the coefficients $\alpha$ and $\beta_2$ and a bandwidth determined by the coefficient $\beta_1$. Accordingly, if the coefficient $\beta_1$ is set equal to 0, the system becomes a digital oscillator in that the sequence of numbers $f(n)$ and $f(n-1)$ are then samples of a sinusoid at frequencies determined by $\beta_2$. The input X is then a constant. If the output Y is to be a modulated sinusoid, frequency modulation could be achieved by controlling $\beta_2$ and amplitude modulation by adding a multiplier (or controlling one of the coefficients $A_o$, $A_1$ and $A_2$) to multiply the filter output by the modulating variable.

Figure 4:
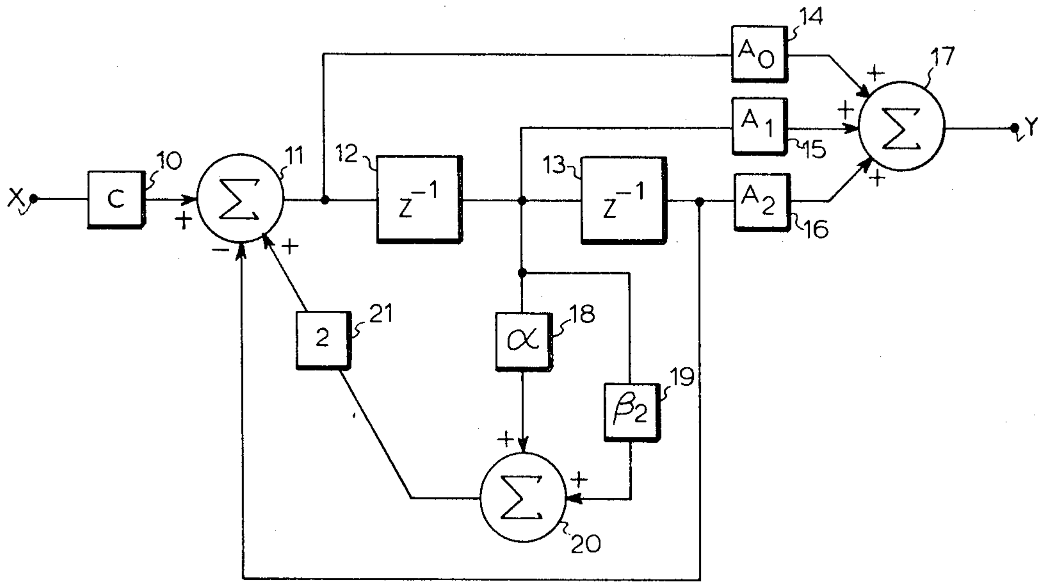
FIG. 4 is a schematic diagram illustrating another special case of the arrangement of FIG. 1, namely, a digital oscillator in accordance with the present invention.

An advantage of such a digital oscillator is that a very low frequency can be provided very simply, using integrated circuits for the functional components. Upper frequencies near 100 kHz. are also possible. A further advantage is that fine frequency control can be obtained by varying the coefficient $\beta_2$ by small and accurately controlled increments. Still another advantage is that any relative phase can be obtained at the same frequency by the proper choice of the coefficients $A_o$, $A_1$ and $A_2$. Several systems of the same configuration can be made to operate under control of the same clock at different frequencies with any desired relative phasing. FIG. 4 illustrates the configuration of one oscillating system. Since only $\beta_1$ is set equal to 0, only the summing means 22 and the multiplier 23 of the configuration illustrated in FIG. 1 is omitted in the configuration of FIG. 4. As before, the remaining functional components are identified by the same reference numerals as in FIG. 1.

Figure 5:
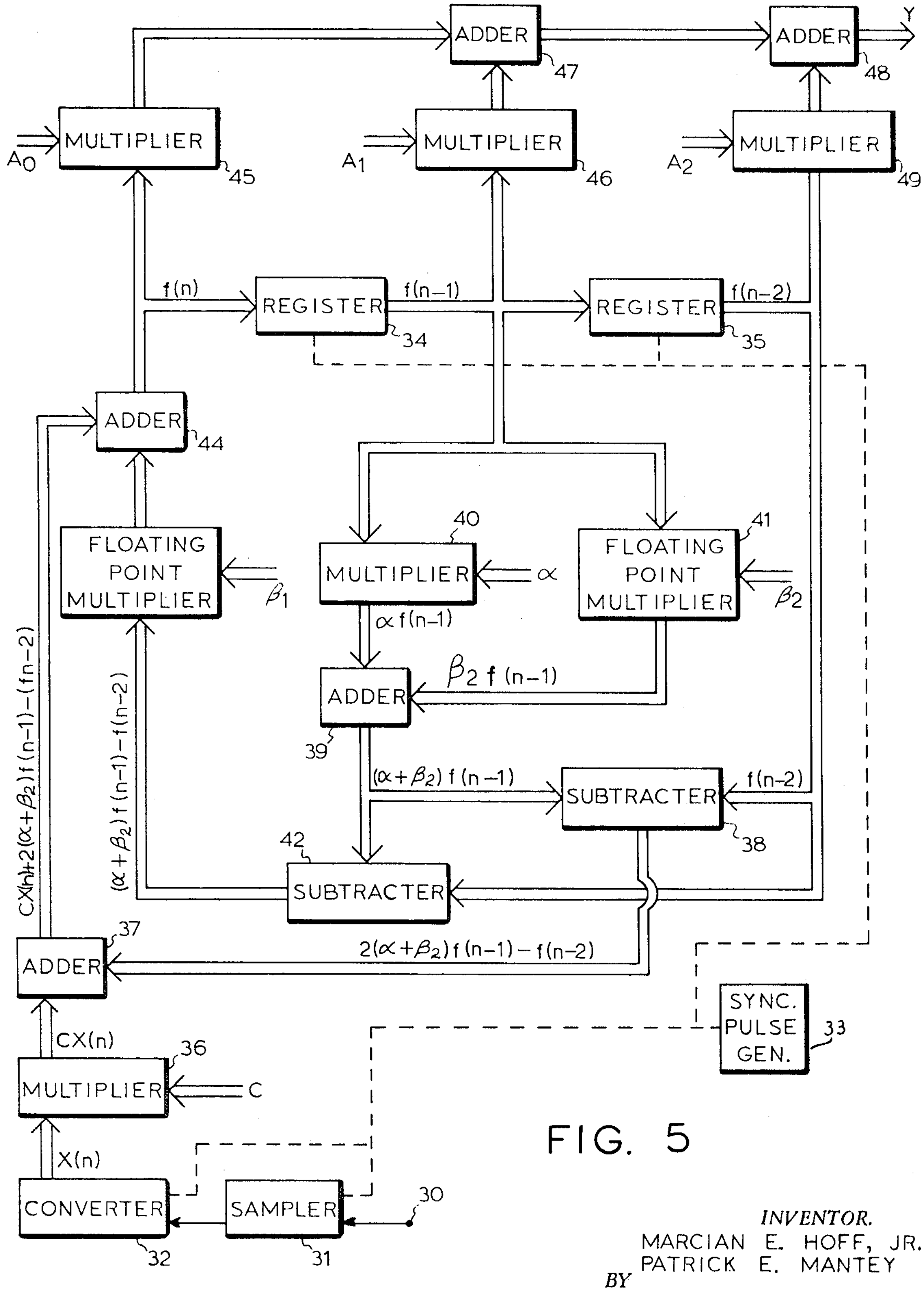
FIG. 5 is a block diagram illustrating the manner in which the schematic diagram of FIG. 1 may be organized employing conventional digital computer components.

Referring now to FIG. 5, a more hardware-oriented diagram of the configuration of FIG. 1 that may be readily and economically constructed with parallel integrated circuits is shown. An input terminal 30 is adapted to receive an analog signal which is periodically sampled and converted to a digital form X($n$) by sampler 31 and analog-to-digital converter 32 synchronously operated under control of clock pulses from a synchronizing pulse generator 33, as represented by dotted lines. The delay operators implemented with buffer registers 34 and 35 are also synchronously operated by the same clock pulses applied to the sampler 31 and converter 32. The balance of the system comprising multipliers and adders, or in some cases subtractors, is also synchronized by timing signals produced by the synchronous pulse generator in a manner well known to those skilled in the art of digital computer organization and operation. However, for simplicity the synchronizing system for the other functional components has been omitted.

A multiplier 36 is provided to multiply the digitized input X($n$) by the coefficient C. As noted hereinbefore, that may be readily accomplished with gating circuits for shifting the input X($n$) a specified number of places if the coefficient C is a power of 2. The output of that multiplier is applied as one input to a two-input adder 37 which implements part of the summing means 11 illustrated in FIG. 1. In other words, the function of the summing means 11 of FIG. 1 has been distributed in the configuration of FIG. 5 since a two-input adder may be more easily implemented. Moreover, it should be noted that the summing means 11 is required to add three inputs and subtract a fourth, namely the sequence of numbers $f(n-2)$. That subtraction is made in the configuration of FIG. 5 by a subtractor 38 which may in practice be an adder modified to add the two's complement of $f(n-2)$ thereby subtracting $f(n-2)$ from the output of an adder 39.

The adder 39 performs the function of the summing means 20 and the multiplier 21 illustrated in FIG. 1. Since the multiplication by two in a binary system corresponds to a shift of the multiplicand to the left (in the direction of greater significance) 1-bit position, the function of multiplier 21 is achieved by permanently connecting the output terminals of the adder 39 to input terminals of the subtractor 38 displaced 1-bit position to the left. Accordingly, the functional component 21 has no separate counterpart in the configuration of FIG. 5. If the configuration of FIG. 1 were to be implemented by serial adders and subtractors, rather than by parallel adders and subtractors as shown in FIG. 5 (should a serial system be or become feasible) the operation of the functional component 21 of FIG. 1 could be readily implemented by introducing a 1-bit delay at the input of the subtractor 38 for the output of the adder 39. Multipliers 40 and 41 are provided to implement the functions of the multipliers 18 and 19 respectively in the configuration of FIG. 1.

The sequence of numbers of $f(n-2)$ is also to be subtracted from the output of the adder 30 to carry out the function of the summing means 22 of FIG. 1. Accordingly, a subtractor 42 is provided in the same configuration as the subtractor 38 except that the binary digits of the output from the adder 39 are connected to directly corresponding input terminals of the subtractor 42, and not offset 1-bit position to the left as in the subtractor 38. A multiplier 43 is then provided to implement the function of the multiplier 23 in FIG. 1. The output of that multiplier is combined with the output of the adder 37 in an adder 44. Accordingly, the adder 44 provides as its output a sequence of numbers $f(n)$ corresponding directly to the output of the summing means 11.

The output of the adder 44 is applied to the first delay operator, register 34, and to a multiplier 45 which corresponds to the multiplier 14 of FIG. 1. The output of the first delay operator is then applied directly to a second delay operator, register 35, and a multiplier 46 which corresponds to the multiplier 15 of FIG. 1. The output of the multiplier 46 is applied as an input to an adder 47 the output of which is applied to an output adder 48. The other input to the output adder 48 is derived from a multiplier 49 which corresponds to the multiplier 16 of FIG. 1. Accordingly, the function of the summing means 17 in the configuration of FIG. 1 is distributed between the adders 47 and 48 so that, as in the case of the summing means 11, two-input adders may be employed.

Regarding the various multipliers in the configuration of FIG. 5, it should be noted that the coefficients applied thereto are normally constant and therefore are to be regarded as either inputs provided through an input console (not shown) or inputs "wired" permanently to the multiplier at the time the configuration of FIG. 5 is installed for operation. In any case, the coefficients are to be regarded as inputs provided at the time the system is put into operation, or at the time the system is assembled. If registers are to be employed to store the coefficients entered from an operator's console, the registers may be regarded as integral parts of the respective multipliers or as external storage registers. The difference is only in point of view.

In practice, the various multipliers are preferably implemented as floating-point multipliers since multiplication may then be carried out more expeditiously. In that event, the coefficients are provided in two parts, a first part comprising the mantissa and the second part comprising the characteristic.

In the configuration of FIG. 5, several digital filters may be implemented with a single channel by adding arrays of gates which select one set of coefficient values and one set of intermediate stored values. Each filter to be added via multiplexing requires its own storage array for its intermediate values $f(n-1)$ and $f(n-2)$. The clock pulses are applied only to the selected set of storage elements, after allowing sufficient time for the signals to propagate through the hardware. Such multiplexing reduces the number of clock pulses available to each individual filter and therefore reduces the ultimate frequency limit of the multiplexed filters. If multiplexing of the input variable X is provided, one multiplexed filter may have as its input the output (e.g. the intermediate value $f(n-1)$ or $f(n-2)$ or some combination of these) from another multiplexed filter. In this way, the hardware realizes several two-pole filters in cascade, e.g. four-pole and six-pole filters.

From the foregoing, it should be appreciated that the present invention provides a digital filter with optimum performance and stability. The latter is inherent in the digital techniques employed without any sacrifice in sensitivity. Regarding sensitivity, it should be noted that the coefficient $\beta_1$ employed to realize the different modes of operation (except the first-order filter operation of FIG. 2) is very nearly equal to 0 and operation is sensitive to small changes in the values of the coefficient. Since small changes can be readily made with great accuracy and stability using digital techniques, a stable yet sensitive filter is provided. If changes in $\beta_1$ and $\beta_2$ are to be made in very small increments, a larger number of binary digit positions will be required to specify the coefficients $\beta_1$ and $\beta_2$. In that event, it would be advantageous to specify the coefficients as floating-point variables, thereby significantly reducing the number of binary digit positions required in the multipliers especially since $\beta_1$ $o$. All cost reductions in a multiplier are important because multipliers are among the most expensive of functional components of a digital system.

Although particular embodiments of the invention have been described and illustrated, it is recognaized that modifications and variations may readily occur to those skilled in the art, such as rearranging or combining the arithmetic operations set forth in equation (4), or implementing a plurality of filters with the same multipliers and adders by multiplexing as suggested hereinbefore. Accordingly, it is intended that the claims be interpreted to cover such modifications and equivalents.

What is claimed is:

1. A digital filter comprising:

first and second unit delay operators;

a first summing means connected to said unit delay operators for cyclically computing the equation $f(n)=CX(n)+2Kf(n-1)-f(n-2)+\beta_1[Kf(n-1)-f(n-2)]$ including separate means for producing $2Kf(n-1)$ and $\beta_2 LKf(n-1)-f(n-2)$ ]where $X(n)$ is an input in digital form representing the value of a function for a given computational cycle, $f(n-1)$ is the function $f(n)$ of a preceding computational cycle provided by said first unit delay operator, $f(n-2)$ is the function $f(n-1)$ of a preceding cycle provided by said second unit delay operator, C is a scaling factor having a predetermined value and $\beta_1$ and K are selected coefficients; and a second summing means connected to said unit delay operators for cyclically solving the equation $Y(n)=A_0 f(n)+A_1 f(n-1)+A_2 f(n-2)$ where $Y(n)$ is the filtered function of $X(n)$ in digital form, and $A_o$, $A_1$ and $A_2$ are selected coefficients.

2. A digital filter as defined in claim 1 wherein said coefficient K is the sum of two coefficients $\alpha$ and $\beta_2$ employed to obtain the product $Kf(n-1)$ by adding the product $\beta f(n-1)$ to the product $\beta_2 f(n-1)$, said coefficient $\alpha$ being limited to the values +1,0 and −1 for simplicity in realizing the operation required to achieve the product $\alpha f(n-1)$.

3. A digital filter as defined in claim 2 wherein said product $\beta_2 f(n-1)$ is achieved by a floating-point multiplier, for which said coefficient $\beta_2$ is expressed in logrithmic form, and wherein said product $\beta_1$ $[Kf(n-1)-f(n-2)]$ is formed by a floating-point multiplier for which said coefficient $\beta_1$ is expressed in logrithmic form.

4. A digital filter as defined in claim 1 wherein said coefficients $A_0$, $A_1$ and $A_2$ are selected to be equal to +1, 0 and −1, respectively, whereby, with proper selection of coefficients $\beta_1$, $\beta_2$ and $\alpha$said filter functions as a narrow-band digital filter.

5. A digital filter as defined in claim 4 wherein said coefficients are selected as follows:

$$\alpha=\begin{cases}+1 \text{ for } \omega_oT<\pi/3\\ 0 \text{ for } \pi/3\leq\omega_oT\leq 2\pi/3\\ -1 \text{ for } \omega_oT>2\pi/3\end{cases}$$

$$\beta_1=\rho^2-1$$

$$\beta_2=\frac{2\rho\cos\omega_oT}{\rho^2+1}-\alpha$$

6. A digital filter as defined in claim 1 wherein said coefficient $\beta_1$ is selected to be equal to zero, whereby said filter functions as a digital oscillator operating at a frequency determined by the coefficient $K$.

7. A digital filter as defined in claim 6 wherein said coefficients $A_0$, $A_1$ and $A_2$ are selected to obtain operation of said oscillator at any relative phase of said frequency determined by the coefficient $K$.

8. A digital filter as defined in claim 7 wherein said coefficient K is the sum of two coefficients $\alpha$ and $\beta_2$ employed to obtain the product $Kf(n-1)$, adding the product $\alpha f(n-1)$ to the product $\beta_2 f(n-1)$, said coefficient $\alpha$ being limited to the values +1, 0 and −1 for simplicity in realizing the operation required to achieve the product $\alpha f(n-1)$.

9. A digital filter as defined in claim 8 wherein said product $\beta_2 f(n-1)$ is achieved by a floating-point multiplier, for which said coefficient $\beta_2$ is expressed in logrithmic form, and wherein said product $\beta_1\,[Kf(n-1)-f(n-2)]$ is achieved by a floating-point multiplier for which said coefficient $\beta_1$ is expressed in logrithmic form.

10. A first-order digital filter comprising:

first means for cyclically computing a function $f(n)$ in digital form in accordance with the equation $f(n)=CX(n)+(D+1)f(n-1)$ including separate means for producing $Df(n-1)$ and for adding thereto $f(n-1)$ where $X(n)$ is an input in digital form representing the value of an input function $X$ to be filtered at the onset of a given computational cycle, $f(n-1)$ is the value in digital form of the function $f(n)$ computed during a preceding computational cycle, $C$ is a scaling factor having a predetermined value and $D$ is a selected coefficient;

second means responsive to said first means for providing said function $f(n-1)$ from said function $f(n)$;

third means responsive to said first and second means for cyclically computing a function $Y$ in digital form in accordance with the equation $Y(n)=A_0f(n)+A_1f(n-1)$ where $A_0$ and $A_1$ are selected coefficients.

11. A first-order digital filter as defined in claim 10 wherein said coefficient $D$ is the sum of two coefficients $\alpha$ and $\beta_2$, said coefficients $\alpha$ and $\beta_2$ being employed to obtain the product $(D+1)\,f(n-1)$ by adding $f(n-1)$, to the sum of the products $\alpha f(n-1)$ and $\beta_2 f(n-1)$, and said coefficient $\alpha$ is limited to the value +1, 0 and −1 for simplicity in realizing the operation required to achieve the product $\alpha f(n-1)$.

12. A first-order digital filter as defined in claim 11 wherein said product $\beta_2 f(n-1)$ is achieved by a floating-point multiplier, for which said coefficient $\beta_2$ is expressed in logrithmic form.

13. A second-order digital filter comprising:

first means for cyclically computing a function $f(n)$ in digital form in accordance with the equation $f(n)=CX(n)+2Kf(n-1)-f(n-2)+\beta_1[Kf(n-1)-f(n-2)]$ including separate means for producing $2Kf(n-1)$ and $\beta_1]$ $Kf(n-\alpha 1)-F(n-2)]$ where $X(n)$ is an input in digital form representing the value of an input function $X$ to be filtered at the onset of a given computational cycle, $f(n-1)$ is the value in digital form present during a given computational cycle of the function $f(n)$ computed during a preceding computational cycle, and $f(n-2)$ is the value in digital form present during a given computational cycle of the value $f(n-1)$ present during a preceding computational cycle;

second means responsive to said first means for providing said value $f(n-1)$ in digital form;

third means responsive to said second means for providing said value $f(n-2)$ in digital form;

and fourth means responsive to said first second and third means for cyclically computing a function $Y$ in digital form in accordance with the equation $Y(n)=A_0f(n)+A_1f(n-1)+A_2f(n-2)$ where $C$, $k$, $\beta_1$, $A_0$, $A_1$ and $A_2$ are selected coefficients, and $Y(n)$ is the filtered function of $X(n)$ in digital form.

14. A second order digital filter as defined in claim 13 wherein said coefficient $K$ is the sum of two coefficients $\alpha$ and $\beta_2$ employed to obtain the product $Kf(n-1)$ by adding the product $\alpha f(n-1)$ to the product $\beta_2 f(n-1)$, said coefficient $\alpha$ being limited to the values +1, 0 and −1 and for simplicity in realizing the operation required to achieve the product $\alpha f(n-1)$.

15. A second order digital filter as defined in claim 14 wherein said product $\alpha_2 f(n-1)$ is achieved by a floating-point multiplier, for which said coefficient $\beta_2$ is expressed in logrithmic form, and wherein said product $\beta_1[Kf(n-1)-f(n-2)]$ is achieved by a floating-point multiplier for which said coefficient $\beta_1$ is expressed in logrithmic form.

16. A second order digital filter as defined in claim 14 wherein the coefficients $A_0$, $A_1$ and $A_2$ are selected to have the respective values +1, 0 and −1, whereby with, appropriate selection of coefficients $\beta_1$, $\beta_2$ and $\alpha$, said filter functions as a narrow band digital filter.

17. A second order digital filter as defined in claim 16 wherein said coefficients are selected as follows:

$$\alpha=\begin{cases}+1 \text{ for } \omega_oT<\pi/3\\ 0 \text{ for } \pi/3\leq\omega_oT\leq 2\pi/3\\ -1 \text{ for } \omega_oT>2\pi/3\end{cases}$$

$$\beta_1=\rho^2-1$$

$$\beta_2=\frac{2\rho\cos\omega_oT}{\rho^2+1}-\alpha$$

18. A second-order digital filter as defined in claim 17 wherein the coefficients $\beta_1$ and $\beta_2$ are selected to control the bandwidth and center frequency, respectively.

19. A second-order digital filter as defined in claim 13 wherein the coefficient $\beta_1$ is selected to be zero, whereby said filter functions as an oscillator.

20. A second-order digital filter as defined in claim 19 wherein the frequency of said oscillator may be selectively varied by varying the coefficient $K$.

21. A second-order digital filter as defined in claim 20 wherein said coefficients $A_0$, $A_1$ and $A_2$ are selected to obtain operation of said oscillator at any relative phase at said frequency determined by the coefficient $K$.

* * * * *